(12) United States Patent
Tan

(10) Patent No.: US 9,880,253 B2
(45) Date of Patent: Jan. 30, 2018

(54) VEHICLE OBJECT MONITORING SYSTEM

(71) Applicant: Nissan North America, Inc., Franklin, TN (US)

(72) Inventor: Adrian Tan, Northville, MI (US)

(73) Assignee: Nissan North America, Inc., Franklin, TN (US)

( * ) Notice: Subject to any disclaimer, the term of this patent is extended or adjusted under 35 U.S.C. 154(b) by 314 days.

(21) Appl. No.: 14/525,420

(22) Filed: Oct. 28, 2014

(65) Prior Publication Data

US 2016/0119539 A1   Apr. 28, 2016

(51) Int. Cl.
| | |
|---|---|
| *H04N 7/18* | (2006.01) |
| *G01S 1/04* | (2006.01) |
| *G01S 19/48* | (2010.01) |
| *G01S 1/02* | (2010.01) |
| *G01S 5/02* | (2010.01) |
| *B60R 1/00* | (2006.01) |

(52) U.S. Cl.
CPC .................. *G01S 1/04* (2013.01); *B60R 1/00* (2013.01); *G01S 1/02* (2013.01); *G01S 5/0257* (2013.01); *G01S 5/0284* (2013.01); *G01S 19/48* (2013.01); *B60R 2300/105* (2013.01); *B60R 2300/301* (2013.01); *B60R 2300/602* (2013.01)

(58) Field of Classification Search
CPC ................................ B62D 15/00; B62D 6/007
See application file for complete search history.

(56) References Cited

U.S. PATENT DOCUMENTS

| | | | |
|---|---|---|---|
| 5,949,331 A | 9/1999 | Schofield et al. | |
| 6,483,429 B1 | 11/2002 | Yasui et al. | |
| 7,592,928 B2 | 9/2009 | Chinomi et al. | |
| 7,969,326 B2 | 6/2011 | Sakakibara | |
| 7,984,574 B2 | 7/2011 | Pfohl et al. | |
| 8,041,483 B2* | 10/2011 | Breed ................ | A01C 7/102 192/113.35 |
| 8,077,203 B2 | 12/2011 | Abe | |
| 8,154,426 B2 | 4/2012 | Endo et al. | |

(Continued)

FOREIGN PATENT DOCUMENTS

| | | |
|---|---|---|
| DE | 19741896 A1 | 4/1999 |
| FR | 2979299 A1 | 3/2013 |

(Continued)

*Primary Examiner* — Tat Chio
*Assistant Examiner* — Fabio Lima
(74) *Attorney, Agent, or Firm* — Global IP Counselors, LLP

(57) ABSTRACT

An object detection system is configured to detect location of an object proximate a first surface of a vehicle. A beacon is configured to be positioned and repositioned relative to the vehicle. A controller is configured to process data from the object detection system and position data from the beacon. The controller is configured to define a first zone of interest relative to the first surface of the vehicle body structure without the beacon and further process object location data from the object detection system and output the object location data to the display relative to the first zone of interest. The controller determines current location of the beacon relative to the first surface of the vehicle body structure, defines a second zone of interest relative to the beacon and outputs the object location data to a display relative to the second zone of interest.

18 Claims, 8 Drawing Sheets

(56) References Cited

U.S. PATENT DOCUMENTS

| | | |
|---|---|---|
| 8,155,385 B2 | 4/2012 | Mizuta |
| 8,218,008 B2 | 7/2012 | Wu et al. |
| 8,243,994 B2 | 8/2012 | Suzuki et al. |
| 8,310,376 B2 | 11/2012 | Frank et al. |
| 8,332,097 B2 | 12/2012 | Chiba et al. |
| 8,957,812 B1* | 2/2015 | Hill ................... G01S 5/0027 342/445 |
| 2008/0205706 A1 | 8/2008 | Hongo |
| 2009/0121899 A1 | 5/2009 | Kakinami et al. |
| 2009/0122140 A1 | 5/2009 | Imamura |
| 2010/0211270 A1* | 8/2010 | Chin ................... B62D 6/007 701/44 |
| 2010/0238051 A1 | 9/2010 | Suzuki et al. |
| 2010/0329510 A1 | 12/2010 | Schmid |
| 2012/0069182 A1 | 3/2012 | Sumi et al. |
| 2012/0326917 A1 | 12/2012 | Kiehne |
| 2013/0070607 A1* | 3/2013 | Sun ................... G01S 5/0205 370/241 |
| 2013/0107052 A1 | 5/2013 | Gloger et al. |
| 2014/0146167 A1* | 5/2014 | Friend ................... G01S 17/023 348/118 |
| 2014/0300505 A1* | 10/2014 | Gilbert ................... B60T 7/22 342/71 |
| 2014/0347450 A1* | 11/2014 | Han ................... B60R 1/00 348/48 |

FOREIGN PATENT DOCUMENTS

| | | | |
|---|---|---|---|
| JP | 2007-255976 A | 10/2007 | |
| JP | 4724522 B2 | 7/2011 | |
| JP | 4765213 B2 | 9/2011 | |
| JP | 5386850 B2 | 1/2014 | |
| WO | 2012-172580 A1 | 12/2012 | |
| WO | WO 2013081287 A1 * | 6/2013 | ............... B60R 1/00 |
| WO | 2014-054239 A1 | 4/2014 | |

\* cited by examiner

VEHICLE OBJECT MONITORING SYSTEM

BACKGROUND

Field of the Invention

The present invention generally relates to vehicle object monitoring system that includes a manually positionable locator beacon. More specifically, the present invention relates to an object monitoring system that monitors objects approaching a vehicle in a first zone of interest relative to the vehicle with the beacon deactivated and monitors a second zone of interest relative to the vehicle and the beacon with the beacon activated.

Background Information

Object monitoring systems typically include at least one camera that is focused on and monitors an area adjacent to a vehicle. The object monitoring system usually includes a video display within the vehicle that provides captured images from the camera to a vehicle operator. The video display can include computer generated and/or computer manipulated images of the areas surrounding the vehicle based on the captured images. The vehicle operator uses the images on the video display to determine whether or not there is an object in the display with the vehicle moving and approaching the object.

SUMMARY

One object of the disclosure is to provide a vehicle with a monitoring system that can monitor a first zone of interest relative to the vehicle and can also monitor a second zone of interest relative to dimensions of cargo within a cargo area of the vehicle.

Another object of the disclosure is to provide a monitoring system with a movable beacon positioned by a vehicle operator such that the monitoring system detects the location of the beacon and monitors a zone of interest relative to the beacon.

In view of the state of the known technology, one aspect of the disclosure is a vehicle object monitoring system that includes a vehicle body structure, an object detector, a beacon and a controller. The vehicle body structure has a first surface on an exterior of the vehicle body structure. The object detector is fixedly positioned relative to the first surface of the vehicle body structure and configured to detect proximity of an object relative to the first surface. The beacon is configured to be selectively positioned relative to the vehicle body structure. The controller is configured to receive and process data from the object detector and position data from the beacon, such that in response to the beacon being in a deactivated mode, the controller is configured to define a first zone of interest relative to the first surface of the vehicle body structure and further process object location data from the object detection system and output an indication of the proximity of an object relative the first zone of interest. In response to the beacon being in an activated operation mode, the controller determines current location of the beacon relative to the first surface of the vehicle body structure and defines a second zone of interest relative to the location of the beacon and outputs an indication of the proximity of an object relative to the second zone of interest.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
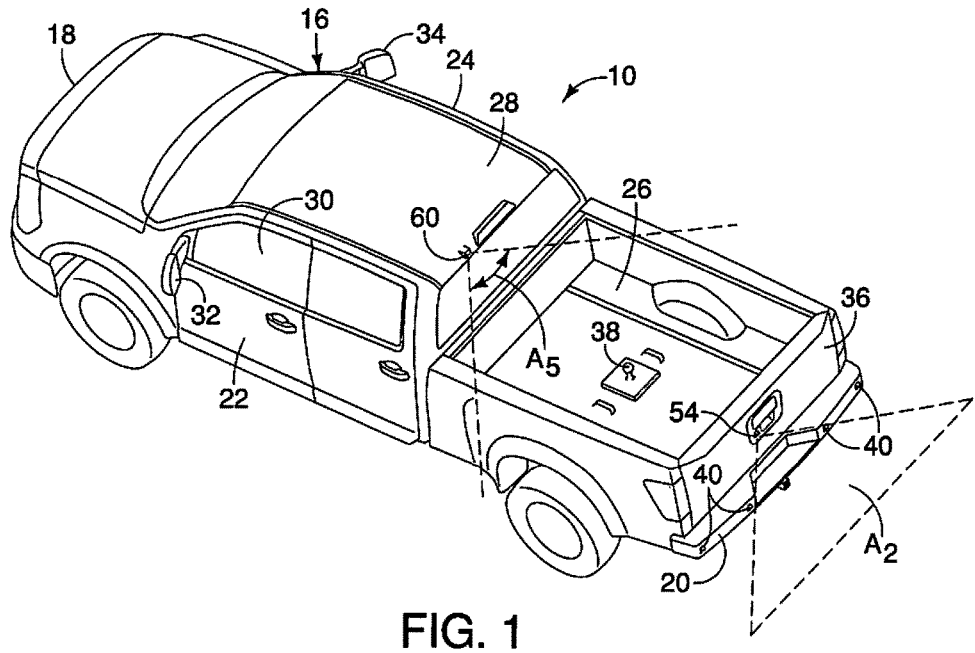
FIG. 1 is a perspective view of a vehicle that includes an object monitoring system, a cargo area, the vehicle having a vehicle video system with a camera positioned to capture video of the cargo area in accordance with a first embodiment.

Referring initially to FIG. 1, a vehicle 10 is illustrated in accordance with a first embodiment. The vehicle 10 includes an object monitoring system 12 that is shown in FIG. 2 and described in greater detail below.

Figure 4:
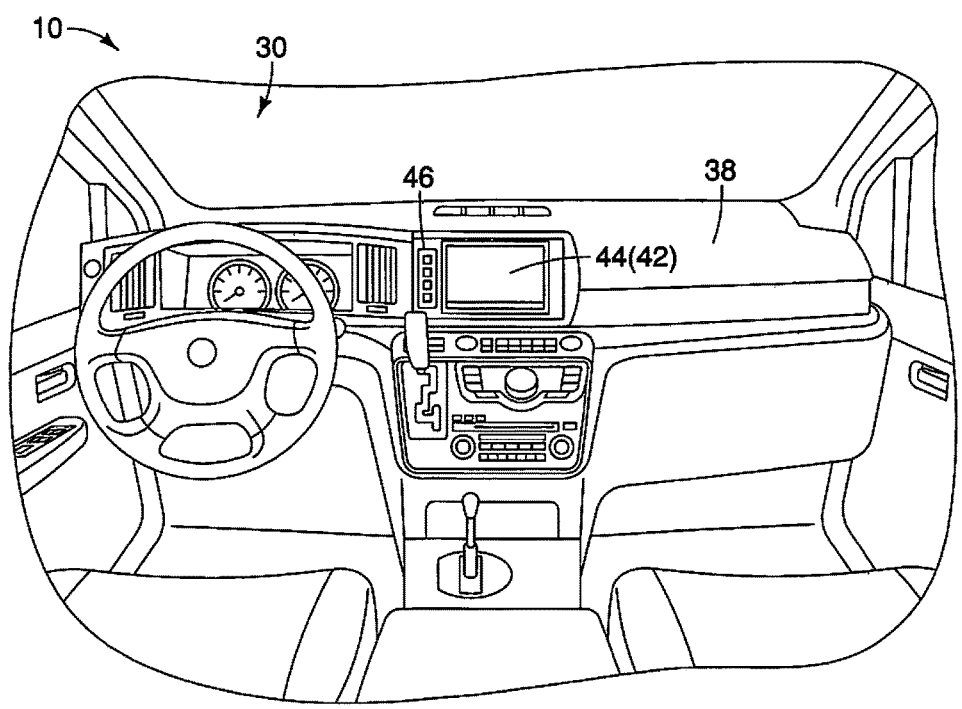
FIG. 4 is a view of a passenger compartment of the vehicle showing the video display of the vehicle video system in an instrument panel in accordance with the first embodiment.
Figure 6:
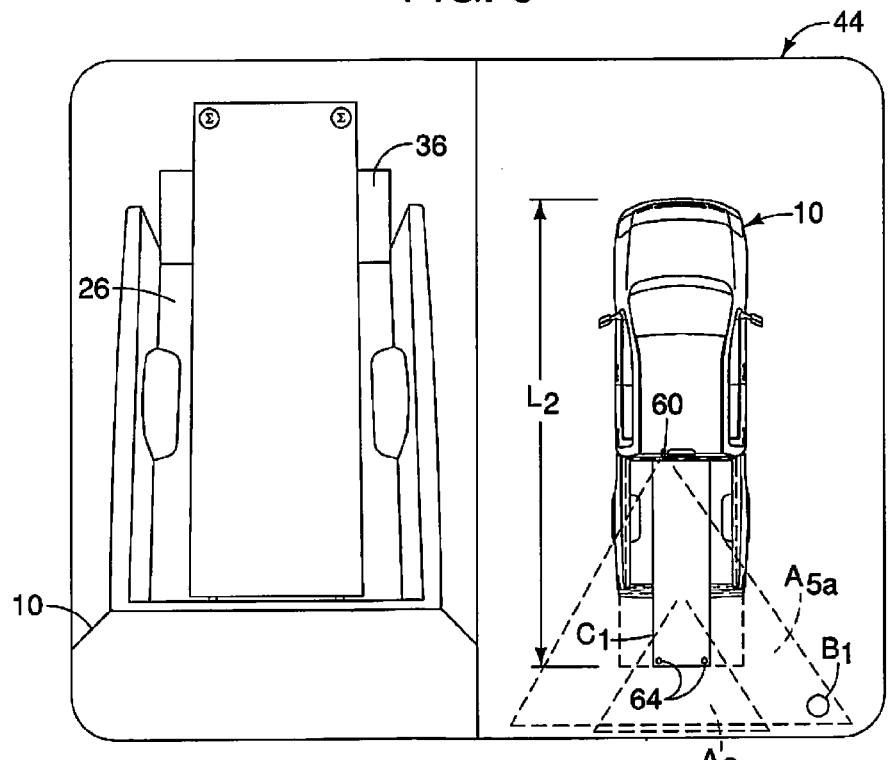
FIG. 6 is another schematic view of the video display with the split screen, one side streaming the video captured by the cargo area camera and the other side streaming a simulated overhead view of the cargo area based on a re-calculated zone of interest and a re-calculated length of the vehicle as a result of the use of a beacon placed on cargo in the cargo area of the vehicle in accordance with the first embodiment.

The vehicle 10 also has a vehicle body structure 16 that includes a front end 18, a rear end 20, a driver's side 22, a passenger's side 24, a cargo area 26, a roof structure 28, a passenger compartment 30, a side view mirror 32 and a side view mirror 34. The cargo area 26 includes a tailgate 36 that is movable between a closed orientation (FIG. 1) and an open orientation (FIG. 6). As shown in FIG. 4, the passenger compartment 30 includes an instrument panel 38.

Figure 2:
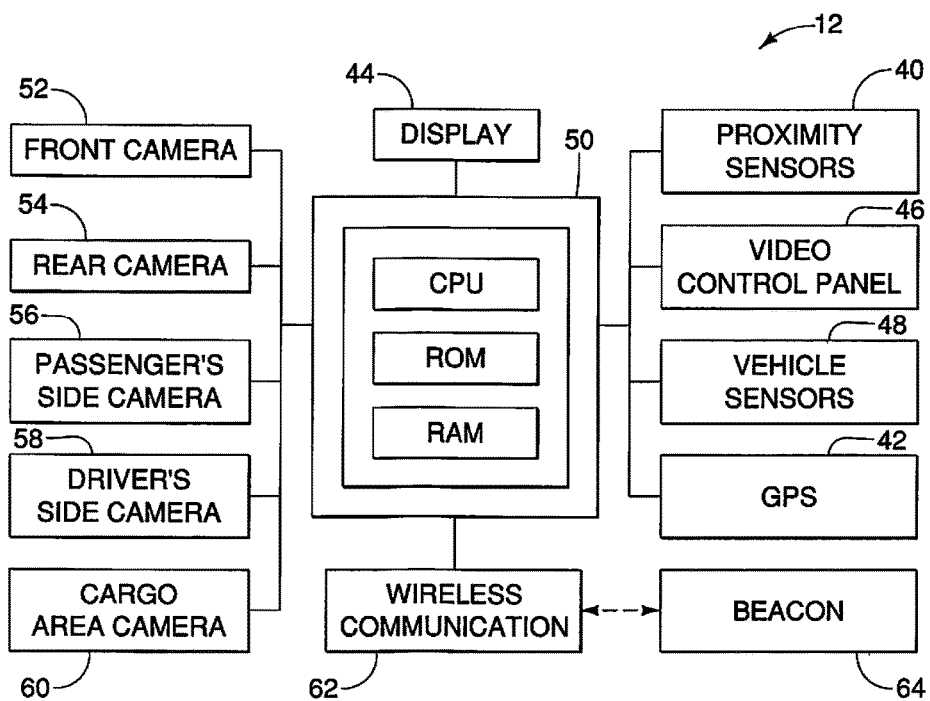
FIG. 2 is a schematic view of the vehicle video system showing a plurality of cameras, including a front camera, a rear camera, a passenger's side camera and a driver's side camera, the cargo area camera, an image processor and a video display in accordance with the first embodiment.

The object monitoring system 12 is schematically depicted in FIG. 2 and includes proximity sensors 40, a GPS device 42 (global positioning satellite device), a video display 44, a video control panel 46, a plurality of vehicle sensors 48, a controller 50, a front camera 52, a rear camera 54, a passenger's side camera 56, a driver's side camera 58, a cargo camera 60, a wireless communication device 62 and a beacon 64. Although not shown, the object monitoring system 12 can include an audio generator that has a hidden speaker or can be connected to the entertainment system in order to generate audio warning signals. The object monitoring system 12 is configured to display captured images from one or more of the cameras onto the video display 44 to assist a vehicle operator when maneuvering the vehicle 10 during, for example, parking operations or backing up operations. As shown in FIG. 2, the proximity sensors 40, the GPS device 42, the video display 44, the video control panel 46, the plurality of vehicle sensors 48, the front camera 52, the rear camera 54, the passenger's side camera 56, the driver's side camera 58, the cargo camera 60 and the wireless communication device 62 are all electronically connected to or coupled to the controller 50. The beacon 64 is in electronic communication with the controller 50 and can be manually positioned by a vehicle operator on the vehicle 10 and/or on cargo carried by the vehicle 10, as is explained in greater detail below.

The proximity sensors 40 are preferably installed to the perimeter of the vehicle 10, preferably at least to both front and rear surfaces of the vehicle 10 (e.g. the bumper fascias) and are configured to detect the proximity of objects as the vehicle 10 approaches the objects. The proximity sensors 40 can be any of a plurality of differing types of sensors often referred to as detection and ranging sensors or devices. Specifically, the proximity sensors 40 each include an emitting section (not shown) and a detecting section (not shown). The emitting section emits a prescribed signal and the detecting section detects returning signals that reflect back from of surfaces of nearby objects. For example, each of the plurality of sensors can be a sonar emitting and detecting device, a radar emitting and detecting device, an infrared emitting and detecting device and/or a laser light emitting and light detecting device (i.e. LIDAR). Since detection and ranging sensors are conventional devices, further description is omitted for the sake of brevity. The proximity sensors 40 are connected to the controller 50 and detect the presence of objects as the vehicle 10 moves toward those objects. The controller 50 is further configured to provide an indication of the proximity of the detected object to the vehicle operator either visually and/or audibly, as described further below.

The GPS device 42, the video display 44 and the video control panel 46 are installed to the instrument panel 38 within the passenger compartment 30, as shown in FIG. 4. The controller 50 can be installed anywhere within the vehicle 10, but is preferably concealed behind the instrument panel 38 within the passenger compartment 30. Alternatively, the video display 44 can be part of a heads-up-display along a section of the windshield of the vehicle 10. In yet another alternative embodiment, the video display 44 can be located on an upper surface of the instrument panel 38 adjacent to the driver's side front door of the vehicle 10.

Figure 3:
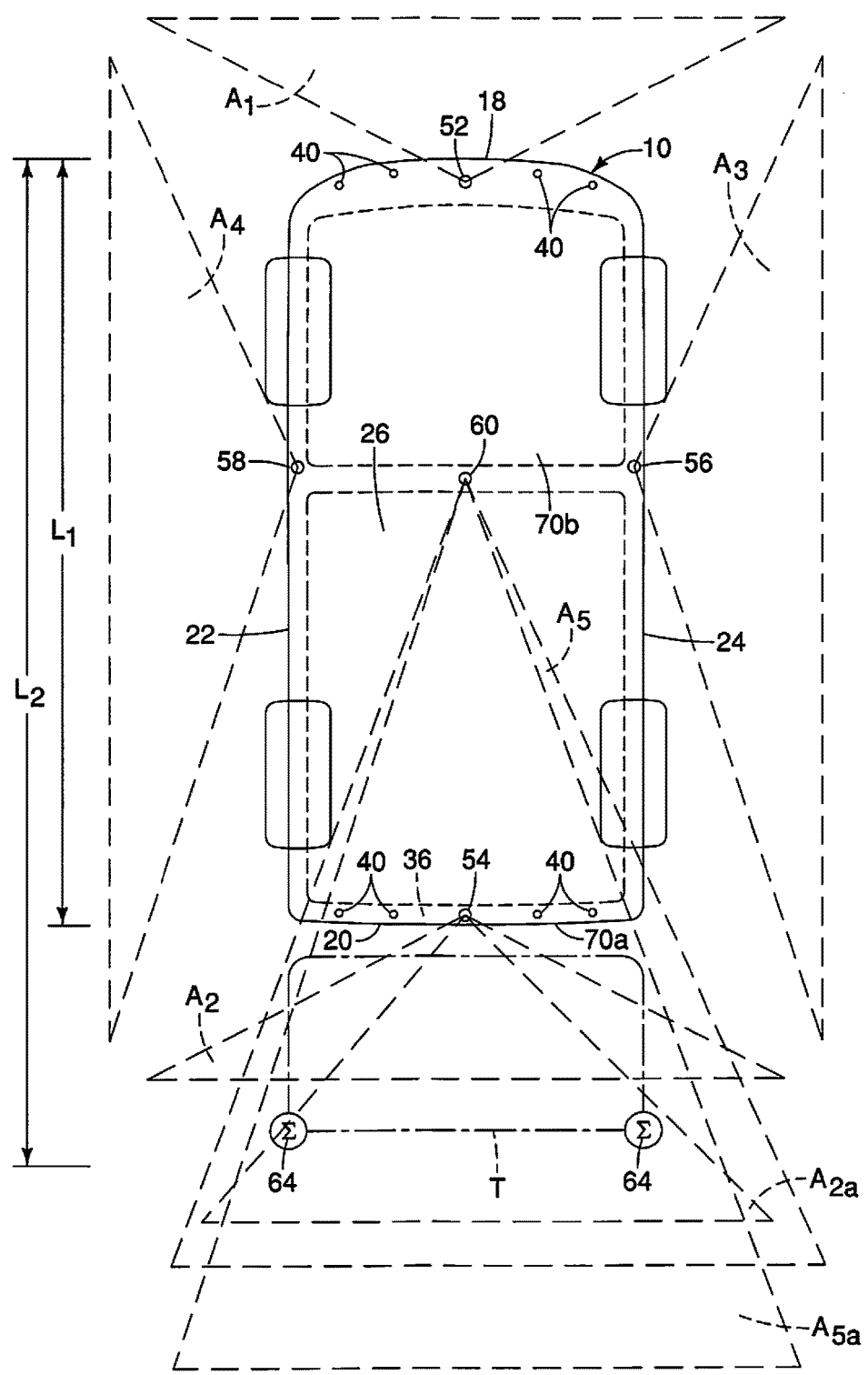
FIG. 3 is a schematic view of the vehicle showing the locations of the plurality of cameras in accordance with the first embodiment.

As shown in a schematic view in FIG. 3, the front camera 52 is located at the front end 18 of the vehicle 10. The rear camera 54 is installed at a fixed location in the tailgate 36. The passenger's side camera 56 is installed along a lower surface of the side view mirror 34 and the driver's side camera 58 is installed along a lower surface of the side view mirror 32. The cargo camera 60 is installed to a rear section of the roof structure 28 and is aimed rearward to view the cargo area 26.

The wireless communication device 62 is connected to the controller 50 and is configured to communicate with the beacon 64 and with other vehicles. The wireless communication device 62 can also include a plurality of transceivers (not shown) installed at various locations around the vehicle 10 for use with, for example, a keyless entry system. Further, the transceivers of the wireless communication device 62 communicate with the beacon 64 triangulating with signals from the beacon 64 in order to determine the exact location of the beacon 64 relative to the vehicle body structure 16.

The beacon 64 can be a simple transmitter that emits signals via a radio broadcasting device received by the wireless communication device 62, which can include a radio signal positioning sensor. Alternatively the beacon 64 can be an electronic positioning device that communicates with the wireless communication device 62 via any of a variety of electronic communication conventions, such as WIFI™, Bluetooth®, and/or radio frequency devices. The beacon 64 can be configured to operate in an activated mode where signals are emitted by the beacon 64 and in a de-activated mode, the beacon 64 does not emit signals. Alternatively, the beacon 64 can include a standby mode. For example, in the activated mode, the beacon 64 can broadcast positioning signals at predetermined first intervals (for example, one signal every 30 seconds), for a predetermined amount of time (for example, for 5 minutes after activation), to ensure that the controller 50 has identified the position of the beacon 50 relative to the vehicle 10. Thereafter, the beacon 64 can automatically set itself into the standby mode in which signals cease, but are broadcasted at predetermined second intervals (for example, once every 30 minutes) to preserve battery power. The control panel 46 can be used to activate or deactivate the beacon 64 or the beacon 64 can be provided with a mechanical switch or interface to be activated and deactivated.

The beacon 64 can alternatively be further configured to provide positioning information relative to the vehicle 10. For example, the beacon 64 can include a global positioning satellite device (GPS). The communications between the beacon 64 and the wireless communication device 62 is such that the controller 50 can determine the precise location of the beacon 64 with the beacon 64 located, for example, on cargo that is on the vehicle 10 or at partially within the cargo area 26. In other words, the beacon 64 is configured for use with the vehicle 10 to provide location information to the controller 50, to enhance the object monitoring and object detecting capability of the object monitoring system 12, as is explained in greater detail below. The beacon 64 can be a device that is hardwired and/or tethered to the vehicle 10 via a cable (not shown). However, in the depicted embodiment, the beacon 64 is a portable device powered by internal batteries and can be positioned and repositioned at various locations on cargo and/or a trailer, as is described in greater detail below. Specifically, the beacon 64 can be mechanically attached to and/or coupled to the cargo or trailer via any of a variety of mechanical attachment devices, such as straps, fasteners, or other similar attachment contrivances.

In the description of the object monitoring system 12, several terms are used in a manner consistent with the definitions provided below.

Specifically, the terms "video", "video image" or "video images" as used herein refer to a series of captured images showing current movement or lack of movement in a predetermined area captured by each respective one of the plurality of cameras including the cargo area camera 60.

The term "simulated live overhead view" as used herein refers to a video image of an area that is captured by one or more cameras that are not physically oriented to capture a literal top plan view of the area. Rather, the captured video images are processed to generate or form an appearance of a top plan view of the corresponding area.

The terms "stream", "streaming", "streaming video", or other similar forms as used herein include storing the video image in a storage device (e.g. RAM, hard drive, FLASH memory, etc.,) prior to displaying. However, preferably, the streaming has only a prescribed amount of latency (125 milliseconds delay or less—125 milliseconds is $\frac{1}{8}^{th}$ of a second) between the moment of capture and the moment the video image or video images are displayed on the display 44.

As is described in greater detail below, the display 44 is configured to display a variety of video images in the form of streaming video from the plurality of cameras as processed by the controller 50. Specifically, the display 44 receives processed video data from the controller 50 based upon video images captured by one, selected ones or all of the plurality of cameras of the object monitoring system 12 depicted in FIG. 2. The display 44 can be configured in any of a variety of ways. For example, the display 44 can display: streaming video from just one selected camera at a time; streaming video from all of the cameras; or a simulated overhead view where some or all of the captured video images are manipulated by the controller 50 and then superimposed over a still image of the vehicle 10, to produce the simulated overhead view of the vehicle 10 and surrounding areas on all sides of the vehicle 10, as is described in greater detail below. Further, the display 44 can provide warnings in the form of lighted areas of the simulated overhead view of the vehicle 10 that are close to a detected object as monitored by the proximity sensors 40. In the depicted embodiments, the display 44 is also configured to provide a split screen where half of the viewing area of the display 44 shows the actual streaming video images from the selected camera and the other half of the display 44 shows the selected overhead simulated view of the vehicle 10 and the areas around the vehicle 10.

The vehicle surroundings or areas around the vehicle 10 captured by the plurality of cameras, and the cargo within the cargo area 26 are included in the video images processed by the image processor 50. The image processor 50 can also process the video images of objects in the cargo area 26 and in the areas surrounding the vehicle 10 by using a relation between pixel addresses of the images before and after the conversion. Specifically, the image processor 50 carries out a viewpoint conversion (of the respective images of vehicle surroundings taken by the plurality of cameras) to the simulated overhead views. Then, after the viewpoint conversion, the image processor 50 joins the video images of the vehicle surroundings. With this, the image processor 50 converts the video images of the vehicle surroundings to the overhead view images (looking down the image-taking area from directly overhead at the center of the vehicle).

More detailed descriptions of various processes used to generate overhead simulated views can be found in, for example, U.S. Patent Application Publication No. 2010/0238051, published Sep. 23, 2010 (application Ser. No. 12/680,423), U.S. Patent Application Publication No. 2012/0069182, published Mar. 22, 2012 (application Ser. No. 13/232,146), and U.S. Pat. No. 8,243,994, issued Aug. 14, 2012 (application Ser. No. 12/298,837) all commonly assigned to Nissan Motor Co. Ltd. The disclosures of U.S. Patent Application Publication No. 2010/0238051, U.S. Patent Application Publication No. 2012/0069182, and U.S. Pat. No. 8,243,994 are incorporated herein by reference in their entirety.

The video control panel 46 in the instrument panel 38 is provided with one or more controls that allow an occupant of the vehicle 10 to select the type of view desired for output on the display 44. For example, the video control panel 46 can be provided with quick glance buttons or inputs (not shown) that cause the controller 50 to stream captured images from a specific one of the plurality of cameras for just a short, predetermined period of time. One example of such a quick glance button includes a request to stream the captured video from the passenger's side camera 56 for ten (10) to fifteen (15) seconds to the display 44 so that the driver monitor the status of objects within the field of view of the passenger's side camera 56. Another example of a quick glance button includes a request to stream the captured video from the cargo area camera 60 for ten (10) seconds to fifteen (15) seconds so that the driver monitor the status of objects in the cargo area 26. Other features of the object monitoring system 12 are explained in greater detail below.

The vehicle sensors 48 vary from vehicle to vehicle. The vehicle sensors 48 can be a single sensor or an array of sensors. However in the depicted embodiment, the vehicle sensors 48 can include a vehicle speed sensor (not shown), a transmission sensor (not shown) and a tailgate position sensor within the tailgate 36 or at the rear end 20 of the vehicle 10. The speed sensor provides vehicle speed information to the controller 50 such that, below a prescribed speed, the image processor within the controller 50 automatically sets the display 44 to, for example, display a video image captured by a predetermined one of the cameras, or alternatively, can shut off the display 44 during high speed operation of the vehicle 10 (e.g., above speeds typically associated with parking procedures). The transmission sensor can be configured to provide the controller 50 with the status of the transmission of the vehicle 10. For example, when the transmission is set in reverse such that the vehicle 10 is capable of moving rearward, the video image captured by the rear camera 54 can be automatically displayed on the display 44. The tailgate position sensor provides an indication of the position of the tailgate 36. For example, when the tailgate 36 is in an open position, the performance of the rear camera 54 may be altered or the rear camera 54 may be deactivated. The tailgate position sensor of the plurality of sensors 48 provides the controller 50 with an indication of the status of the rear camera 54. Also when the tailgate position sensor indicates that the tailgate 36 is open, the controller 50 can automatically define a rear end of the vehicle 10 as being the rearmost edge of the tailgate 36 (in the open position).

The controller 50 is configured to process the various video images captured by the plurality of cameras 52, 54, 56, 58 and 60 in a manner described in greater detail below. The controller 50 preferably includes a microcomputer (i.e., a central processing unit or CPU) with a video processing control program that processes streaming video output to the display 44. The controller 50 can also include other conventional components such as an input interface circuit, an output interface circuit, and storage devices such as a ROM (Read Only Memory) device and a RAM (Random Access Memory) device. The microcomputer of the controller 50 is programmed to process the video images from the plurality of cameras in order to generate simulated overhead views of the areas captured by each of the plurality of cameras, as is described in greater detail below. The memory circuit stores processing results and control programs such as ones for video processing operations that are run by the controller 50. The controller 50 is operatively coupled to the plurality of cameras and the display 44 in a conventional manner, such as by coaxial cables, computer cables, wireless connections or other similar configurations capable of transferring video images or video data from one location to another within a vehicle. The internal RAM of the controller 50 stores statuses of operational flags and various control data. The internal ROM of the controller 50 stores image data and transformational data for various operations. The controller 50 is capable of selectively controlling any of the components of the video system 12 in accordance with the control program. It will be apparent to those skilled in the art from this disclosure that the precise structure and algorithms for the controller 50 can be any combination of hardware and software that will carry out the functions of the present invention.

It should also be understood from the drawings and the description herein that the controller 50 can be programmed to stream any of a variety of combinations of video images to the display 44 in combination with warning information of approaching objects based on proximity data from the proximity sensors 40. The depictions of the display 44 and its streamed content shown in FIGS. 11-14 are some examples of the types of streamed video images that can be shown in the display 44. However, the present invention is not limited to the examples of streamed video images shown on the display 44 in FIGS. 5 and 6. The display 44 can show a full screen video image or multiple split screen configurations depending upon the pre-programming and configuration of the controller 50.

The basic operation of the controller 50 absent the beacon 64 is further described in U.S. application Ser. No. 13/608,646, filed Sep. 10, 2012, U.S. Patent Application publication No. 2014/0071279, assigned to Nissan North America, Inc. U.S. application Ser. No. 13/608,646 is incorporated herein in its entirety.

The controller 50 is pre-programmed with precise dimensions of the vehicle 10. Specifically, the controller 50 includes data and information that correlates the location of each of the plurality of cameras 52, 54, 56, 58 and 60 and proximity sensors 40 to the dimensions and relative locations of the various surfaces of the vehicle 10. It should be understood that each of the plurality of cameras 52, 54, 56, 58 and 60 and the proximity sensors 40 is precisely located on respective areas of the vehicle 10, as described above. The controller 50 is pre-programmed with a correlation between each of the plurality of cameras 52, 54, 56, 58 and 60 and the proximity sensors 40 and their positions relative to the dimensions of the vehicle 10.

Specifically, as shown in FIG. 3, the camera 52 is correlated with the area $A_1$ forward of the front end 18 of the vehicle 10, the camera 54 is correlated with the area $A_2$ rearward of the rear end 20 of the vehicle 10, the camera 56 is correlated with the area $A_3$ adjacent to the passenger's side 24 of the vehicle 10, the camera 58 is correlated with the area $A_4$ adjacent to the driver's side 22 of the vehicle 10 and the camera 60 is correlated with the area $A_5$ which includes the cargo area 26 and areas rearward of the vehicle 10. Each of the areas $A_1$, $A_2$, $A_3$, $A_4$ and $A_5$ is a zone of interest with respect to the object monitoring system 12 in that if the vehicle 10 approaches an object in any one of the areas $A_1$, $A_2$, $A_3$, $A_4$ and $A_5$, the vehicle operator is provided with object information and warnings that the vehicle 10 is approaching the observed object. The captured images of the plurality of cameras in combination with the proximity data from the proximity sensors 40 enables the controller 12 to provide audio warning signals and/or visual warnings of the proximity of a detected or observed object and/or a visual representation of the object.

The proximity sensors 40 detect the presence of object within corresponding areas (zones of interest). For example, the proximity sensors 40 that are installed to the rear bumper fascia at the rear end 20 of the vehicle 10, detect the presence of objects approaching the rear end 20 of the vehicle 10 that are within the area $A_2$. Similarly, the proximity sensors 40 that are installed to the front bumper fascia at the front end 18 of the vehicle 10, detect the presence of objects approaching the front end 18 of the vehicle 10 that are within the area $A_1$. However, the proximity sensors 40 can be installed to any surface of the vehicle 10 to detect the presence of objects approaching that surface.

The controller 50 is further configured to determine the location of the beacon 64 when the beacon 64 is used by a vehicle operator. Specifically, the controller 50 is configured to monitor signals received from the beacon 64. In particular, the controller 50 is configured to determine the precise location of the beacon 64 relative to the vehicle 10 and relative to each of the areas $A_1$, $A_2$, $A_3$, $A_4$ and $A_5$. When the beacon 64 is in the activated mode and is at a fixed location relative to the vehicle 10, the controller 50 determines the actual location of the beacon 64 relative to the vehicle body structure 16 and/or one or more of the areas $A_1$, $A_2$, $A_3$, $A_4$ and $A_5$. Once the controller 50 determines the location of the beacon 64, the controller 50 alters the corresponding one or more of the areas $A_1$, $A_2$, $A_3$, $A_4$ and $A_5$ by re-dimensioning the corresponding area in order to view objects that may interfere with movement of the vehicle 10, as is described in the examples below. The re-dimensioning of the zone of interest in response to the location of the beacon 64 applies to a re-dimensioning of the field of view of the corresponding one of the cameras and applies to a change to the range monitored by the proximity sensors 40 that monitor the corresponding area adjacent to the vehicle 10.

The controller 50 is also configured to determine the location of the beacon 64 visually. Specifically, the beacon 64 can be provided with a visible identification mark, such as, for example, the symbol sigma Σ. Alternatively, the beacon 64 can be provided with an illuminating element, such as an LED, that is detected by one of the cameras, and can be processed by the controller 50 in the determination of the location of the beacon 64 relative to the vehicle 10. The controller 50 processes images from each of the plurality of cameras 52, 54, 56, 58 and 60. If one or more of the plurality of cameras 52, 54, 56, 58 and 60 captures images of the identification mark on the beacon 64, the controller 50 is configured to triangulate and determine the location of the beacon 64 relative to the vehicle 10 based on the visual recognition of the visible identification mark.

In order to describe the object monitoring system 12, a first surface is defined at a predetermined location on the vehicle 10. The first surface in the examples described below can be any one of the surfaces to which one of the plurality of cameras or proximity sensors is installed. The first surface is a reference point for processing of information by the controller 50 and the enlargement of the corresponding one of the areas $A_1$, $A_2$, $A_3$, $A_4$ and $A_5$ where the beacon 64 is located. Further, course prediction lines can be generated by the controller 50 corresponding to the direction of travel of the vehicle 10. For example, when in reverse, the controller 50 can generate the course prediction lines in anticipation of parking. With the beacon 64 being activated, and re-calculated dimensions of the vehicle 10 being determined by the controller 50, the controller 50 can also automatically re-dimension generated course prediction lines corresponding to the re-calculated dimensions of the vehicle 10. In addition, the course prediction lines can be continuously updated during a maneuver of the vehicle 10 by the controller 50 depending upon whether or not the cargo load has cleared obstacles based on the re-calculated dimensions of the vehicle 10 based on position signals from the beacon 64.

In a first example of the usage of the beacon 64 represented in the schematic view in FIG. 3, the first surface is the surface 70a (a first surface) at the rear end 20 of the vehicle 10 and the rear surface of the tailgate 36 where the rear camera 54 is installed. Depending upon the further information available to the controller 50, the first surface can alternatively be the surface 70b at the rear of the roof structure 28 where the cargo camera 60 is installed, a front surface or one of the side surfaces of the vehicle 10. However, it should be understood from the drawings and the description herein that the first surface can be any of the surfaces of the vehicle 10 that includes one of the plurality of cameras 52, 54, 56, 58 and 60 and/or the proximity sensors 40. Further, in the example described below, the first surface is a reference point for calculating a dimension of the vehicle 10, as used by the controller 50.

In the example depicted in FIG. 3 a trailer attachment T has been connected to the rear end 20 of the vehicle. The trailer attachment T can be an actual trailer, or a tray that is installed to a trailer hitch (not shown) at the rear of the vehicle 10. The trailer attachment T in effect lengthens the vehicle 10. Since trailer attachments T vary from manufacturer to manufacturer, the controller 50 cannot make any adjustment to the object monitoring system 12 in order to take the presence of the trailer attachment T into account when providing object monitoring information to the vehicle operator via the video display 44. Therefore, the beacon 64 is employed for use by the controller 50 to provide appropriate adjustments in the operation of the object monitoring system 12.

When the trailer attachment T is attached to the vehicle 10, the vehicle operator can install one or more of the beacons 64 to the most distant surfaces of the trailer attachment T relative to the vehicle body structure 16, or can attach the beacon 64 to the most distant surface and/or highest surface of cargo loaded onto the trailer attachment T. As indicated in FIG. 3, the vehicle operator has attached two of the beacons 64 to the trailer attachment T at the two rearmost corners of the trailer attachment T in a manner such that the presence of the two beacons 64 is visually observed by the rear camera 54 and the cargo camera 60. Further, using either GPS positioning technology, the wireless communication device 62, and/or the vehicle sensors 46, the controller 50 can determine the locations of the beacons 64 relative to the vehicle 10. The signals from the beacons 64 provide the controller 50 with location information of the beacons 64. The controller 50 processes this information and determines whether or not the area $A_2$ and/or the area $A_5$ need to be re-dimensioned to account for the presence of the trailer attachment T.

Since the beacons 64 in FIG. 3 are located rearward of the tailgate 36, the controller 50 determines that the areas $A_2$ needs to be re-dimensioned so that objects can be observed rearward of the location of the beacons 64. Specifically, the controller 50 takes the area $A_2$ (a first zone of interest) and re-dimensions it into a larger area $A_{2a}$ (a second zone of interest). Similarly, the controller 50 can take the area $A_5$ and re-dimensions it into a larger area $A_{5a}$. Thus, the object monitoring system 12 can change the size and dimensions of the area or field of view of the camera in order to observe approaching objects. The controller 50 can adjust the range and/or focus of the proximity sensors 40 or the focus of the appropriate camera, or change the computer processing of the captured images from the camera (zoom out) in order to change the size and dimensions of the original area (a first zone of interest) to a larger area (a second zone of interest). Captured images from the re-dimensioned area (zone of interest) are then displayed by the controller 50 on the video display 44. Further, three beacons 64 can be used and their position determined by the controller 50. For example, a first one of the beacons 64 can be placed on the most distant driver's side corner of cargo or the trailer attachment T, a second one of the beacons 64 can be placed on the most distant passenger's side corner of the cargo or the trailer attachment T and a third one of the beacons 64 can be placed on the highest point of the cargo or the highest point of the trailer attachment T. When the controller 50 processes the positions of all three beacons 64, it is possible for the controller 50 to determine a three dimensional model of the cargo and/or the trailer attachment T thereby more accurately providing the vehicle operator with appropriate re-calculated dimensions of the vehicle 10. As indicated in FIG. 3, with the beacon 64 being in the deactivated mode, the controller 50 has stored in memory pre-determined calculated length $L_1$ of the vehicle body structure 16 such that the first surface (for example, the surface 70a at the rear end 20 of the vehicle 10) of the vehicle body structure 16 corresponds to one end of the vehicle body structure 16 in the determined calculated length $L_1$. Further, with the beacon 64 in the deactivated mode, the controller 50 produces predetermined course prediction lines based on the pre-determined calculated length $L_1$ of the vehicle body structure 16. With the beacon 64 being in the activated mode, the controller 50 further determines an adjusted calculated length $L_2$ of the vehicle body structure 16 such that the location of the beacon 64 replaces the first surface in the defining one end of the vehicle body structure 16. Further, with the beacon 64 in the activated mode, the controller 50 can also produce re-calculated course prediction lines based on the adjusted length $L_2$ of the vehicle body structure 16. In other words, when the controller 50 re-dimensions the area $A_2$ (first zone of interest) into the area $A_{2a}$ (second zone of interest), the controller 50 is defining the beacons 64 as being the rear end of the vehicle 10 with respect to monitoring of the proximity of approaching objects and is also redefining the course prediction lines based on the area $A_{2a}$.

Thus, the object monitoring system 12 includes at least one camera that is fixedly positioned relative to the first surface of the vehicle body structure 16 and configured is to detect location of objects proximate the first surface. In response to the beacon 64 being in the deactivated mode, the controller 50 is configured to define a first zone of interest (in the first example, area $A_2$ or $A_5$) relative to the first surface (and its' camera) of the vehicle body structure 16 and process captured images from the camera focused on the first zone of interest) and output the object location data to the video display 44 relative to the first zone of interest. As well, in response to the beacon 64 being in the activated operation mode the controller 50 determines current location of the beacon 64 relative to the first surface of the vehicle body structure 16 and defines a second zone of interest larger than the first zone of interest relative to the location of the beacon 64 and outputs any observed objects within the second zone of interest to the video display 44.

Preferably, the range and focus of the proximity sensors 40 should be adjusted according to the position of the beacon 64. However, it should be understood that the presence of cargo, or an attachment such as the trailer attachment T, can interfere with the operation of the proximity sensors 40. Therefore, in the presence of the trailer attachment T, the proximity sensors 40 can be disabled by the controller 50.

The controller 50 is also configured to transmit a signal to other vehicles, for examples, other vehicles traveling in a caravan, and inform the other vehicles of the re-calculated length $L_2$ of the vehicle 10, now extended due to the trailer attachment T.

Figure 5:
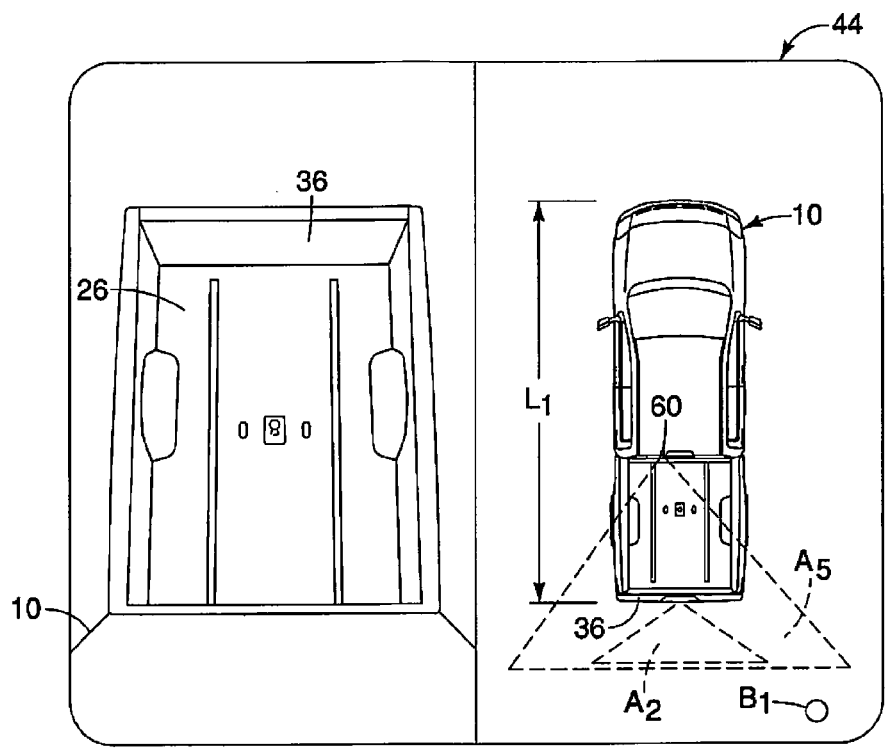
FIG. 5 is schematic view of the video display with a split screen, one side (the left side) showing the video captured by the cargo area camera and the other side (the right side) streaming a simulated overhead view streaming at least a portion of the cargo area and areas adjacent to the rear of the vehicle superimposed over a still image of the vehicle in accordance with the first embodiment.

Another example of the use of the beacon 64 is depicted in FIGS. 5 and 6 where a large piece of cargo $C_1$ is loaded onto the cargo area 26 in FIG. 6. Specifically, in FIG. 5, the cargo camera 60 is aimed to capture images of the cargo area 26. The images captured by the cargo camera 60 are displayed on the left side of the video display 44. On the right side of the video display 44 the simulated overhead view is displayed based on images from all of the plurality of cameras manipulated by the controller 50 to produce the simulated overhead view. The controller 20 defaults to the vehicle 10 having the length $L_1$, as described above, with the cargo area 26 being empty and the tailgate 36 being in the upright or closed orientation. The proximity sensors 40, the rear camera 54 and the cargo camera 60 all observe the rear end 20 of the vehicle 10 and monitor for the presence of objects such as the object $B_1$ that might contact the rear end 20 of the vehicle 10 as the vehicle moves backward (in reverse). Such images are displayed on the video display 44, as shown in FIG. 5.

In FIG. 6, the large piece of cargo $C_1$ has been loaded into the cargo area 26. The vehicle operator re-positions the beacons 60 such that there is one beacon 60 at each of the corners of the cargo $C_1$ that is farthest from the vehicle 10. The controller 50 receives signals from the beacons 64 and re-calculates the length of the vehicle 10 as being the length $L_2$, as shown in FIG. 6. In the example in FIG. 6, the controller 50 extends the distance the proximity sensors 40 normally monitor from the area $A_2$ to the re-dimensioned area $A_{2a}$, and increases the area $A_5$ to the re-dimensioned area $A_{5a}$ for the captured images from the cargo camera 60. As shown in FIG. 5, the proximity sensors 40 (and the rear camera 54) monitor the area $A_2$ with the beacon 64 deactivated. The proximity sensors 40 are configured to continue operating with the tailgate 36 in the lowered position. Therefore, as shown in FIG. 6, the proximity sensors 40 monitor the area $A_{2a}$ with the beacon 64 activated. However, when the tailgate 36 is in the lowered position, the rear camera 54 can be disabled by the controller 50.

It should be understood from the drawings and the description herein, that the controller 50 sends the captured images of the areas ($A_1$, $A_2$, $A_3$, $A_4$ and $A_5$) to the display 44. However, the dashed lines representing the images $A_2$, $A_{2a}$, $A_5$ and $A_{5a}$ in FIGS. 5 and 6 are not necessarily shown in the display 44.

The controller 50 can transmit a signal to other vehicles indicating the re-calculated length $L_2$ of the vehicle 10 and processes object detection information from the cargo camera 60 and the proximity sensors 40 based upon the re-dimensioned area $A_{2a}$, and the re-dimensioned area $A_{5a}$. The proximity sensors 40 and the cargo camera 60 observe the rear end 20 of the vehicle 10 and monitor for the presence of objects such as the object $B_1$ that might contact the rear end of the cargo $C_1$ as the vehicle 10 moves backward (in reverse). Further, the visible identification mark of the beacon 64 (for example, the symbol sigma Σ) could be placed on any number of surfaces.

Figure 7:
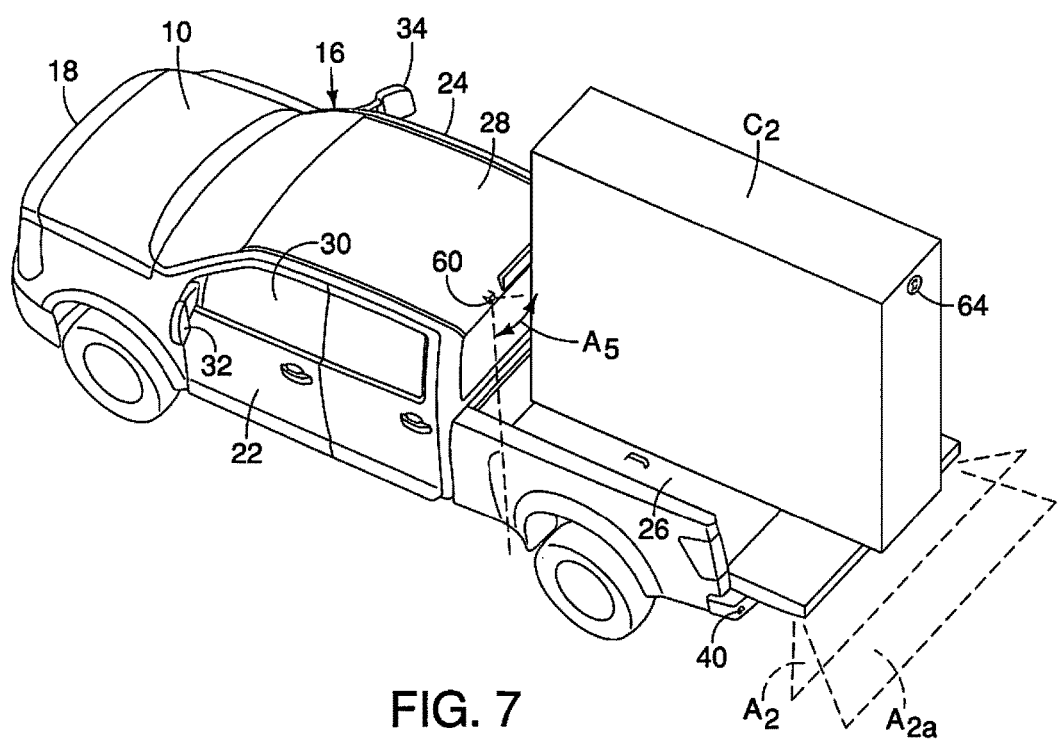
FIG. 7 is a perspective view of the vehicle showing cargo in the cargo area of the vehicle and the beacon place at a rearward-most and highest point of the cargo in accordance with the first embodiment.

As shown in FIG. 7, shows yet another example of the usage of the beacon 64. In FIG. 7, another large piece of cargo $C_2$ is loaded onto the cargo area 26. The cargo $C_2$ is taller than the roof structure 28 of the vehicle 10. The beacon 64 signals to the controller 50 also provide a vertical location of the beacon 64 above the ground. The beacon 64 is attached to a rearmost corner and a highest point on the cargo $C_2$. Therefore, the beacon 64 and the controller 50 can provide the vehicle operator with information with respect to the current height of the vehicle 10 with the cargo $C_2$ in the cargo area 26 in addition to the increased length of the vehicle 10 due to the presence of the cargo $C_2$. The height information can be coupled by the controller 50 to information from the GPS device 42 to provide warnings to the vehicle operator that a lower overpass along the route of travel may be of navigational concern, if the height of the cargo $C_2$ is above a predetermined level. Further, the height information can be transmitted to other vehicles along with altered vehicle length information.

It should be understood from the drawings and the description herein that the beacon 64 can be used on any of a variety of types of cargo. For example, if a bicycle rack is mounted to the roof structure 28 and a bicycle is mounted to that bicycle rack, the beacon 64 can be attached to the top most part of the bicycle, and/or forward-most or rearward-most part of the bicycle to ensure that the vehicle operator and other vehicle are aware of the re-calculated dimensions of the vehicle 10.

Figure 8:
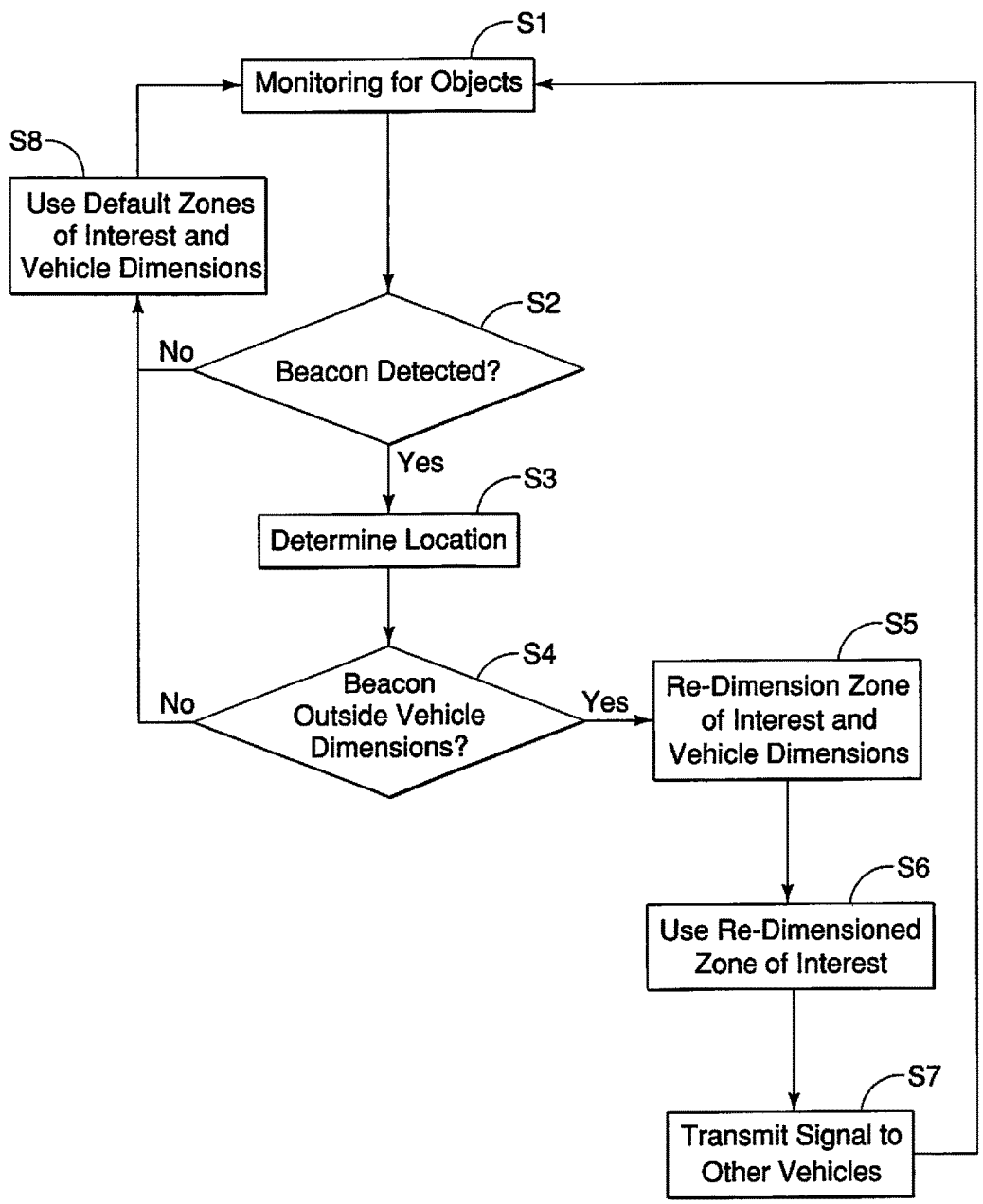
FIG. 8 is a flowchart showing operational steps of the object monitoring system in accordance with the first embodiment.

FIG. 8 is a flowchart showing the various operational steps performed by the object monitoring system 12.

At step S1, the controller 50 monitors for objects that the vehicle 10 may be approaching. At step S2, the controller 50 determines whether or not the beacon 64 has been activated. If the beacon 64 has not been activated, operation moves to step S8, described below. If the controller 50 determines that the beacon 64 has been activated, operation moves to step S3. At step S3, the controller 50 determines the location of the beacon 64 relative to the dimensions of the vehicle 10, including a default length of the vehicle. It should be understood from the drawings and the description herein that the determining by the controller 50 of the activation of the beacon or beacons 64 can be accomplished by any of a variety of means. For example, the beacon or beacons 64 can be activated by switches on the beacons 64 and the controller 64 detects the activation of the beacon(s) 64 by receiving signals from the beacons 64. Alternatively, the controller 64 can transmit signals to the beacon or beacons 64 activating them. In yet another alternative embodiment, the controller 64 can deactivate the beacons 64 when the beacons 64 are located within the original vehicle dimensions or when the beacons 64 are stored in a dedicated storage location within the vehicle 10 for the beacons 64. When the beacons 64 are stored within the original vehicle dimensions or within the dedicated storage location, the controller 50 automatically determines that the beacons 64 are de-activated. Once the controller 50 determines that the one or more of the beacons 64 have been removed from the storage location and positioned relative to the vehicle 10, the controller 50 further determines that the beacon or beacons 64 have been activated. Still further, the determination of whether or not the beacons 64 have been activated can be in the form of a selection made by the vehicle operator.

Next, operation moves to step S4. At step S4, the controller 50 determines whether or not the beacon 64 is located within the dimensions of the vehicle 10. If the beacon 64 is within the dimensions of the vehicle 10 (for example, in the cargo area 26), operation moves to step S8. If the beacon 64 is outside the dimensions of the vehicle 10, operation moves to step S5. At step S5 the controller 50 determines which zone of interest the beacon 64 is within or closest to. For example, if the beacon 64 is rearward of the area $A_2$, two separate calculations are made. First, the area $A_2$ is re-calculated as the above described $A_{2a}$, and enlarged to encompass and/or extend beyond the location of the beacon 64. Second, the length of the vehicle is re-calculated such that the location of the beacon 64 represents a distal end of the vehicle calculations.

Next operation moves to step S6 where the re-dimensioned zone of interest (i.e. area $A_{2a}$) is set for use in the monitoring of objects within that zone of interest. Next, in step S7, the controller 50 can transmit the recalculated length of the vehicle 10 to other vehicles and/or can transmit the recalculated length of the vehicle 10 to highway related infrastructure for traffic management purposes. For instance, vehicles in a caravan with the vehicle 10, can utilize the re-calculated length to determine the optimum following distance from the vehicle 10 to avoid entering the re-dimensioned zone of interest. GPS devices with low bridge height information can provide information related to vehicle height warnings based on the information transmitted by the controller 50 to the highway related infrastructure. Operation then returns to step S1 where objects are monitored as the vehicle 10 is approaching those objects, where the zone of interest set in either step S8 or step S7 is utilized.

In step S8, the default zones of interest (areas $A_1$, $A_2$, $A_3$, $A_4$ and $A_5$) are utilized in step S1 for monitoring of objects.

Second Embodiment

Figure 9:
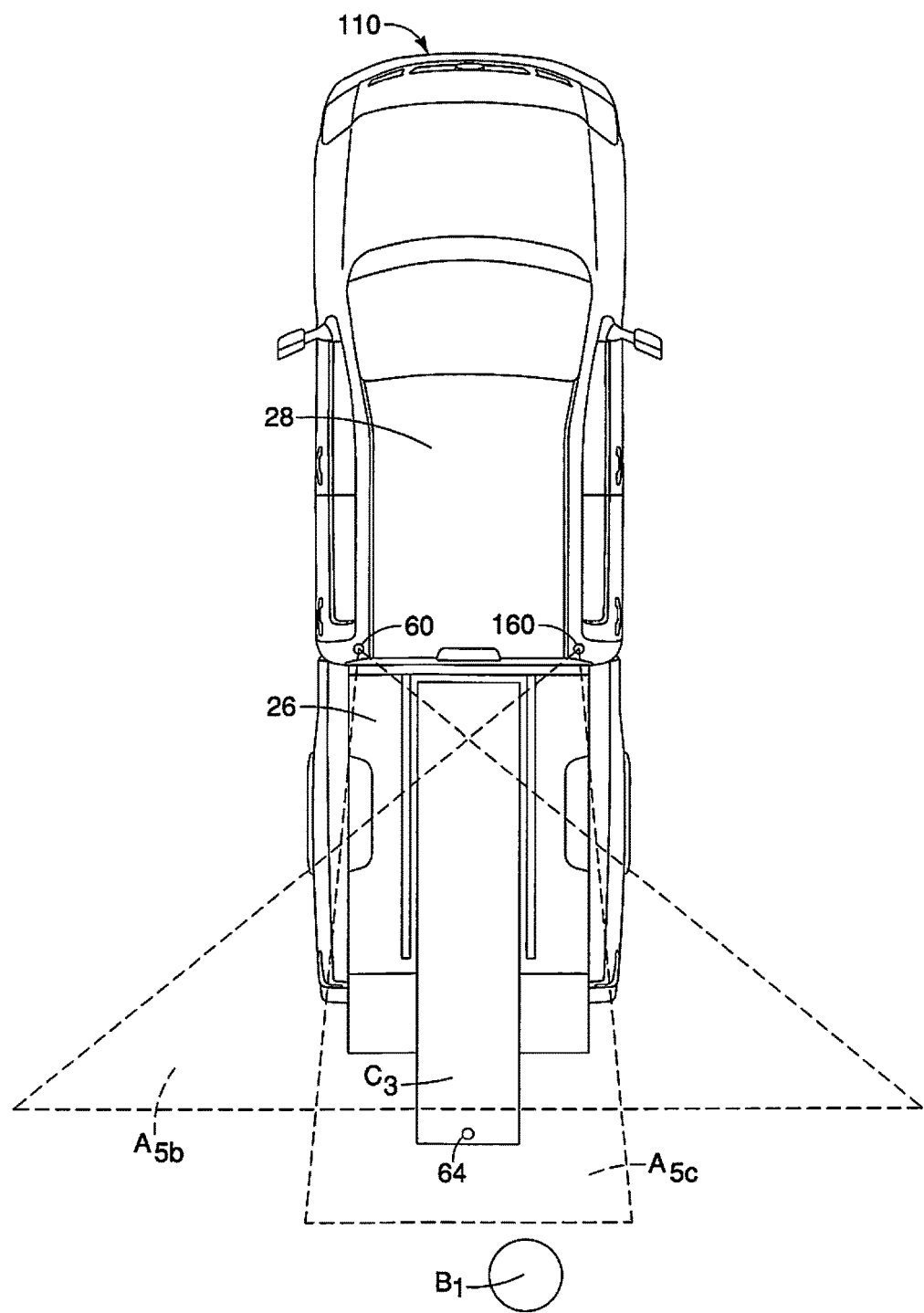
FIG. 9 is a schematic view of a video display showing the simulated overhead view of the cargo area with cargo in the cargo area of the vehicle additionally showing a default zone of interest and a re-calculated zone of interest with an object detected in accordance with a second embodiment.
Figure 10:
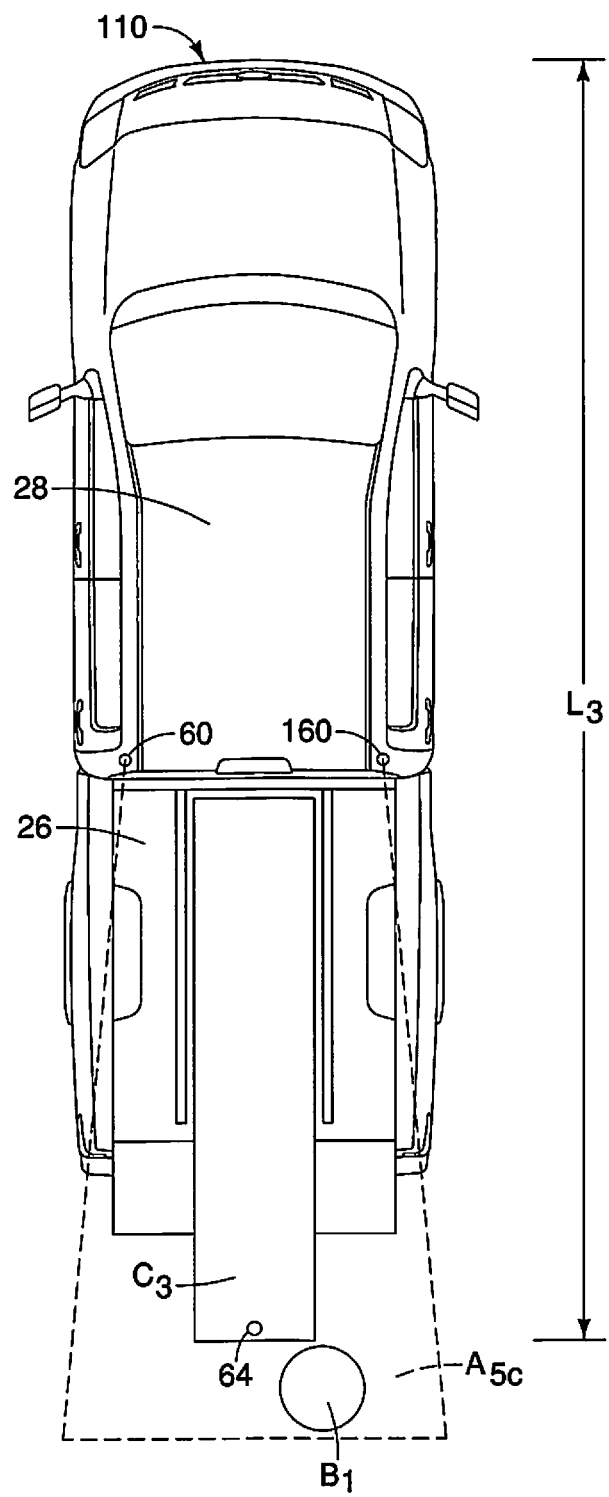
FIG. 10 is another schematic view of the video display similar to FIG. 9 showing the simulated overhead view of the cargo area with cargo in the cargo area of the vehicle additionally showing a re-calculated length of the vehicle as a result of the use of a beacon placed on the cargo in the cargo area of the vehicle with the object being detected in accordance with the second embodiment.

Referring now to FIGS. 9 and 10, a vehicle 110 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the vehicle 110 includes all of the features of the vehicle 10 of the first embodiment. However, in the second embodiment, the vehicle 110 includes the first cargo camera 60 of the first embodiment and additionally includes a second cargo camera 160. The first cargo camera 60 is located at a rear corner of the roof structure 28 at the driver's side 22, and the second cargo camera 160 is located to a rear corner of the roof structure 28 at the passenger's side 24. Thus, an additional view of the cargo area 26 is provided to the controller 50 (not shown in FIGS. 9 and 10). A large piece of cargo $C_3$ is installed to the cargo area 26 and extends rearward beyond the open tailgate 36.

A single one of the beacons 64 is attached to an upper rear end of the cargo $C_3$. The controller 50 recalculates the length of the vehicle as being the length $L_3$ based on the location information provided by the beacon 64 to the controller 50. Further, in addition to the recalculated length $L_3$ of the vehicle 110, the overall footprint of the vehicle 110 is defined by the controller 50 as including the area extending to an end of the cargo $C_3$. Further, an area $A_{5b}$ monitored by the cameras 60 and 160 without the presence of the beacon 64, is re-calculated to the area $A_{5c}$. The area monitored by the proximity sensors 40 is similarly re-calculated. Thus, the proximity sensors 40 and the cameras 60 and 160 observe the rear end of the cargo $C_3$ and monitor for the presence of objects such as the object $B_1$ that might contact the cargo C3 as the vehicle moves backward (in reverse).

There are many ways that the beacon 64 can be utilized and modified. For example, the beacon 64 can be hardwired to the vehicle 10 and the controller 50 via a cable (not shown) that serves as a tether. Alternatively, the beacon 64 can be a portable device that is temporarily placed on distal surfaces of cargo or a trailer, activated such that the beacon 64 transmits its location, which can be detected and stored by the controller 50. The beacon 64 would not be attached to the cargo during transport, but the stored location serves the purpose of the beacon 64 in that the controller 50 re-calculates the zone of interest and/or the length of the vehicle accordingly, operating the object monitoring system 12 with the re-calculated parameters until set to do otherwise. Additionally, original equipment manufacturers (OEM) can use temporary placement of the beacons 64 to store actual dimensions of the vehicle 10 to set initial areas of interest (areas $A_1$, $A_2$, $A_3$, $A_4$ and $A_5$). Furthermore, when the vehicle 10 has been subjected to body modifications that alter the vehicle dimensions, the beacons 64 can be temporarily placed on the modified sections of the vehicle 10 to alter the stored vehicle dimensions. The use of two cameras, such as the cameras 60 and 160, can offer binocular stereoscopic information to the controller 50 used to further refine the calculated dimensions of the vehicle 10. As the vehicle 10 moves, the captured images from the cameras 60 and 160 of the cargo area and/or fixed cargo can be considered as the basis for the re-calculated dimensions of the vehicle 10 and all object moving in the captured images considered by the controller 50 to be environment through which the vehicle 10 is traveling.

In another alternative embodiment, the cameras 60 and 160 can be replaced and/or complemented by the use of a cell phone camera (not shown). In other words, images from a cell phone can be transmitted to the controller 50 by the vehicle operator such that the cell phone also provides position data. The controller 50 uses the position data and the images captured by the cell phone to determine re-calculated dimensions of the vehicle 10.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the object monitoring system. Accordingly, these terms, as utilized to describe the present invention should be interpreted relative to a vehicle equipped with the object monitoring system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle object monitoring system comprising:
    a vehicle body structure having a first surface on an exterior of the vehicle body structure and defining a storage location within the vehicle body structure and a cargo area;
    an object detector fixedly positioned relative to the first surface of the vehicle body structure and configured to detect proximity of an object relative to the first surface;
    a beacon configured to be selectively movable relative to the vehicle body structure, the beacon being further configured to be positioned and repositioned at various fixed locations relative to the vehicle body structure and the cargo area;
    a controller configured to receive and process data from the object detector and position data from the beacon, and configured to determine whether or not the beacon is in the storage location,
    the controller automatically determining that the beacon is in a deactivated mode in response to the beacon being located within the storage location, and
    the controller automatically determining that the beacon is in an activated operation mode in response to the beacon being removed from the storage location and positioned relative to the vehicle body structure such that
    in response to the beacon being in the deactivated mode, the controller is configured to define a first zone of interest relative to the first surface of the vehicle body structure and further process object location data from the object detection system and output an indication of the proximity of an object relative the first zone of interest, and
    in response to the beacon being in the activated operation mode the controller determines current location of the beacon relative to the first surface of the vehicle body structure, defines a second zone of interest relative to the location of the beacon and outputs an indication of the proximity of an object relative to the second zone of interest.

2. The vehicle object monitoring system according to claim 1, wherein
    the controller determines a calculated length of the vehicle body structure, with the first surface of the vehicle body structure defining one end of the calculated length when the beacon is in the deactivated mode, and
    the location of the beacon defines the one end of the calculated length when the beacon is in the activated mode.

3. The vehicle object monitoring system according to claim 2, further comprising
    a communication device configured to transmit the calculated length.

4. The vehicle object monitoring system according to claim 1, wherein
    the controller determines multiple dimensions of the vehicle body structure with the first surface of the vehicle body structure defining one end of the multiple dimensions when the beacon is in the deactivated mode, and
    the location of the beacon defines the one end of the multiple dimensions when the beacon is in the activated mode.

5. The vehicle object monitoring system according to claim 4, wherein
    the determining of the multiple dimensions of the vehicle body structure includes re-determining a height of the vehicle body structure.

6. The vehicle object monitoring system according to claim 4, wherein
    the determining of the multiple dimensions of the vehicle body structure includes re-determining a length of the vehicle body structure.

7. The vehicle object monitoring system according to claim 1, further comprising
    a radio signal positioning sensor, wherein the beacon is a wireless device including a radio broadcast device that transmits signals detectable by the radio signal positioning sensor.

8. The vehicle object monitoring system according to claim 1, wherein
    the beacon is an electronic device that is mechanically coupled to the vehicle body structure and electronically coupled to the controller via a cable.

9. The vehicle object monitoring system according to claim 1, wherein
    the object detection system includes an emission and detection device that determines location of objects by emitting a predetermined emission and detecting reflected emissions from objects proximate the first surface.

10. The vehicle object monitoring system according to claim 1, further comprising
    a display visible from within the passenger compartment of the vehicle body structure, wherein the controller is configured to output representations of the first surface of the vehicle body structure and a detected location of the object relative to the first surface of the vehicle body structure on the display with the beacon in the deactivated mode, and the controller is configured to output representations of the first surface of the vehicle body structure, the beacon and a detected location of the object relative to the beacon and the first surface of the vehicle body structure on the display with the beacon in the activated mode.

11. The vehicle object monitoring system according to claim 1, wherein
the object detector includes a video camera.

12. The vehicle object monitoring system according to claim 11, wherein
the beacon includes a visual feature recognizable by the controller when observed by the video camera.

13. The vehicle object monitoring system according to claim 11, further comprising
a second beacon configured to be selectively positioned and repositioned relative to the vehicle body structure, and
the controller is configured to determine a plurality of dimensions related to the vehicle body structure and position placements of the beacon and the second beacon.

14. The vehicle object monitoring system according to claim 11, wherein
the controller is configured to output an image representing the first surface of the vehicle body structure and an image of a detected object relative to the first surface of the vehicle body structure on the display with the beacon in the deactivated mode, and
the controller is configured to output an image representing the first surface of the vehicle body structure and the beacon, and a video image of a detected object relative to the beacon and the first surface of the vehicle body structure on the display with the beacon in the activated operation mode.

15. The vehicle object monitoring system according to claim 1, further comprising
a communication device configured to transmit a location of the beacon with the beacon in the activated mode.

16. The vehicle object monitoring system according to claim 1, wherein
the first surface of the vehicle body structure is a rear surface of the vehicle body structure adjacent to the cargo area, and
the beacon is configured to attached to a rearmost section of cargo disposed within the cargo area, the rearmost section of the cargo extending rearward of the first surface outside of the cargo area.

17. The vehicle object monitoring system according to claim 1, wherein
the first surface of the vehicle body structure is a rear surface of the vehicle body structure, and
the object detection system includes a plurality of detection devices, one detection device being located proximate a front surface of the vehicle body structure and additional detection devices being located at opposite lateral surfaces of the vehicle body structure.

18. A vehicle object monitoring system comprising:
a vehicle body structure defining a storage location within the vehicle body structure and a cargo area;
a video camera fixedly positioned relative to the cargo area of the vehicle body structure and configured to detect proximity of an object relative to the cargo area;
a beacon configured to be selectively movable relative to the vehicle body structure and the cargo area such that a vehicle operator positions and repositions the beacon at various fixed locations relative to the vehicle body structure and the cargo area;
a controller configured to receive and process data from the video camera and position data from the beacon, and configured to determine whether or not the beacon is in the storage location, the controller automatically determining that the beacon is in a deactivated mode in response to the beacon being located within the storage location, and the controller automatically determining that the beacon is in an activated operation mode in response to the beacon being removed from the storage location and positioned relative to the vehicle body structure such that
in response to the beacon being in the deactivated mode, the controller defines a first zone of interest relative to the cargo area of the vehicle body structure and further process object location data from the video camera and outputs an image representing the cargo area and a video image of a detected object relative to the cargo area within the first zone of interest on the display,
in response to the beacon being in the activated operation mode the controller determines current location of the beacon relative to the cargo of the vehicle body structure, defines a second zone of interest relative to the location of the beacon based on position signals from the beacon and outputs a video image representing a detected object relative to the beacon and the cargo area on the display within the second zone of interest.

* * * * *